Aug. 6, 1957 B. F. VOGELAAR 2,801,511
LEVELING CONTROL SYSTEM FOR AGRICULTURAL MACHINE
Filed May 17, 1954 5 Sheets-Sheet 2
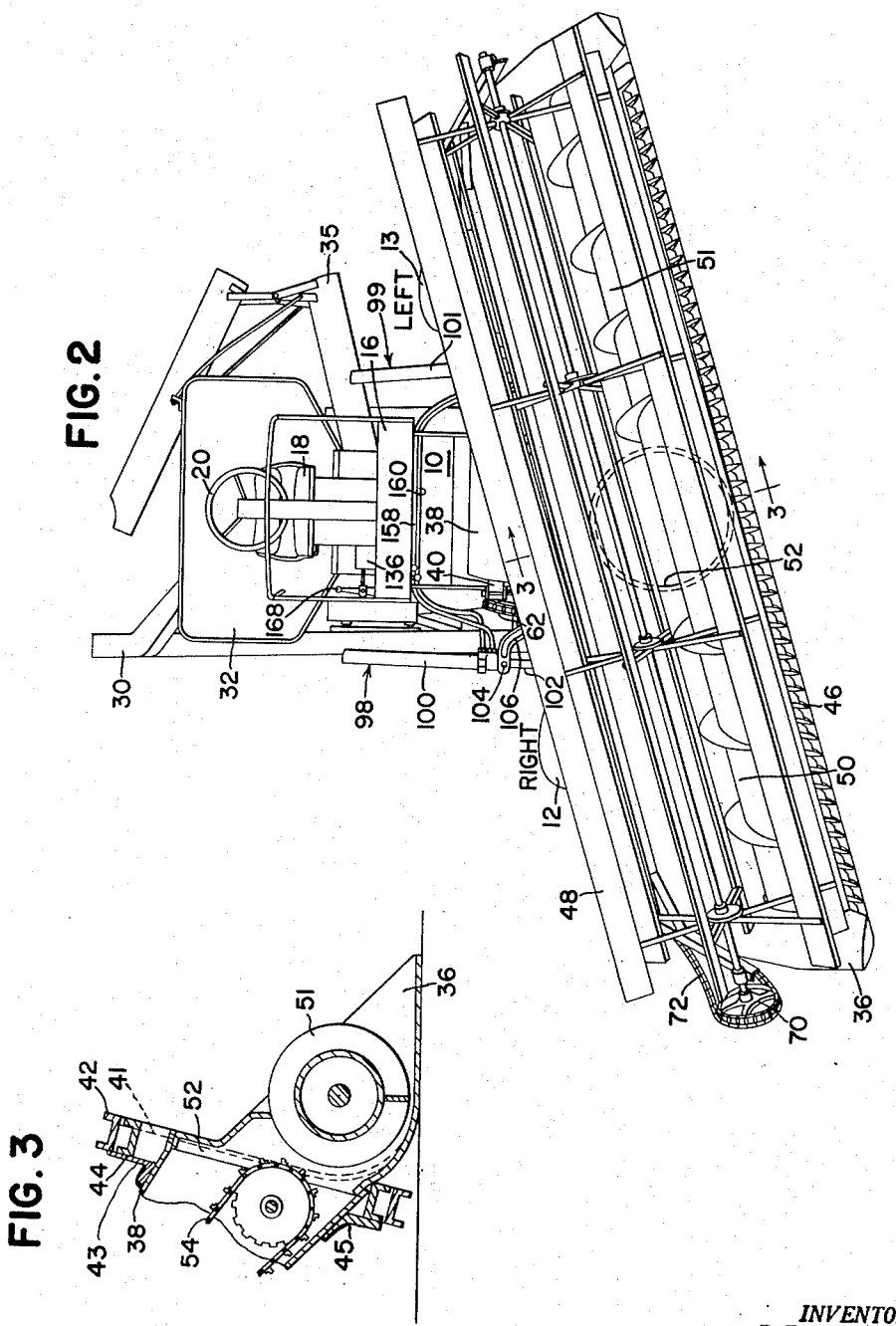
INVENTOR.
B. F. VOGELAAR Aug. 6, 1957  B. F. VOGELAAR  2,801,511
LEVELING CONTROL SYSTEM FOR AGRICULTURAL MACHINE
Filed May 17, 1954  5 Sheets-Sheet 3
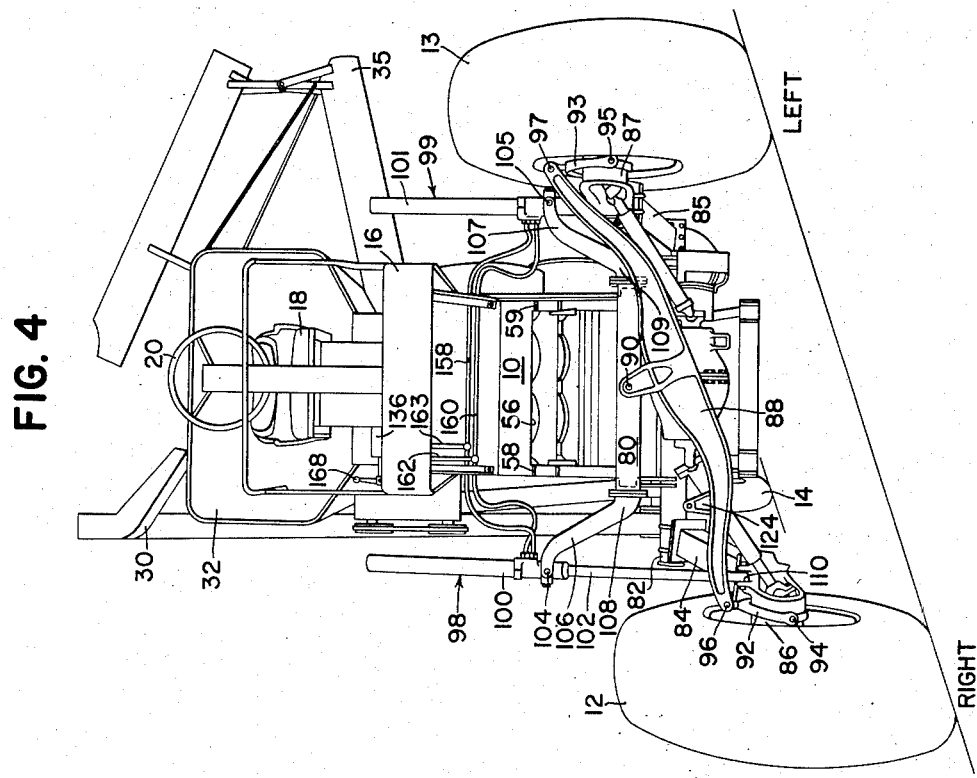
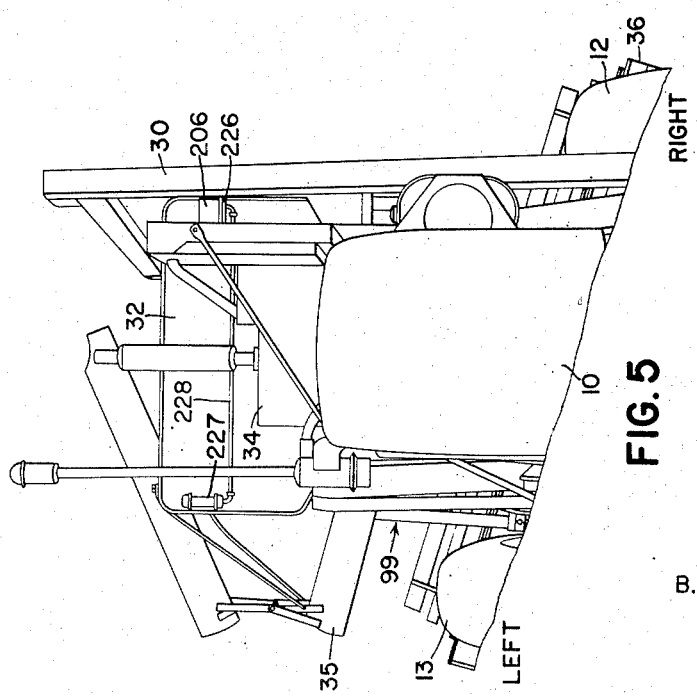
INVENTOR.
B. F. VOGELAAR

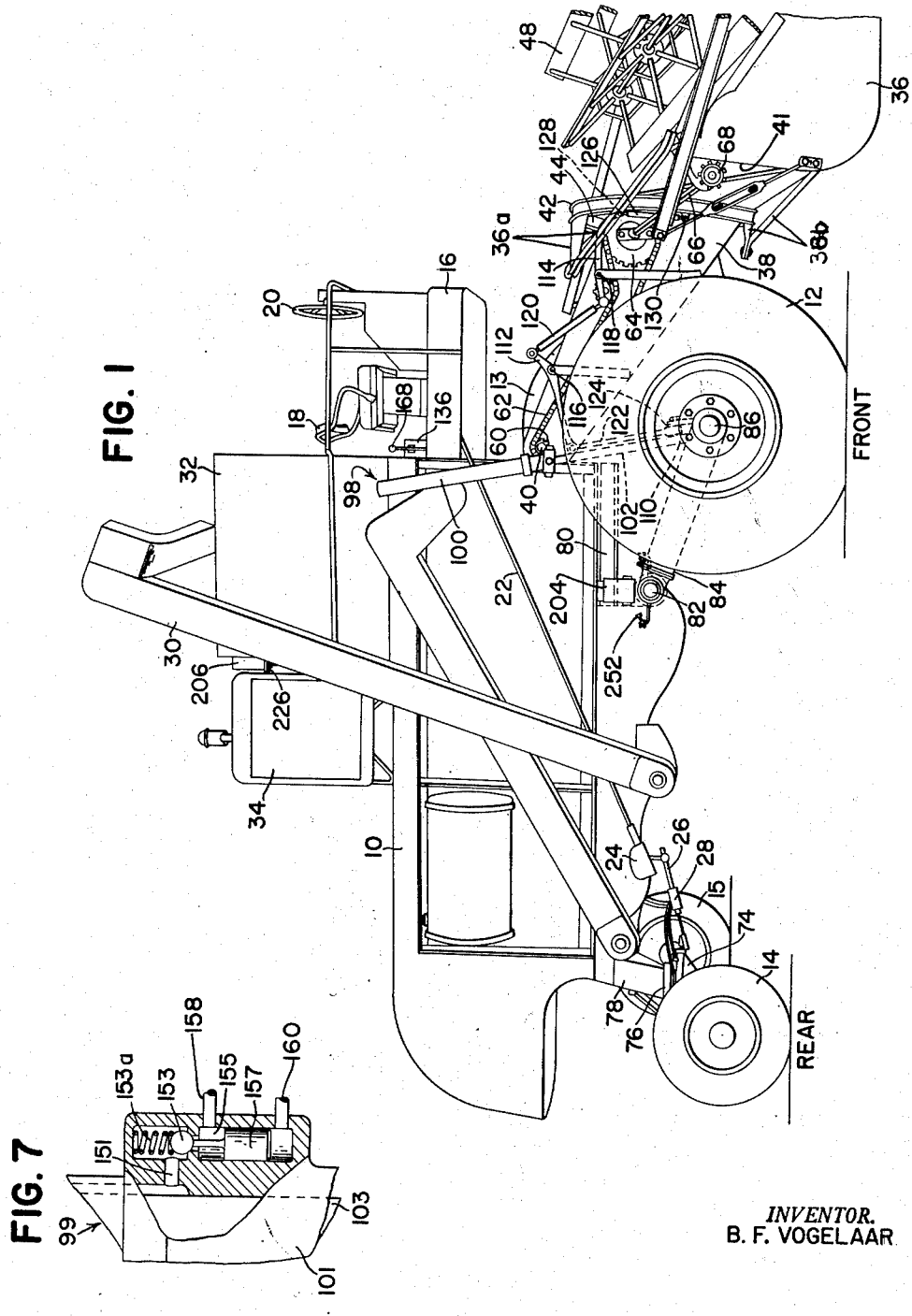

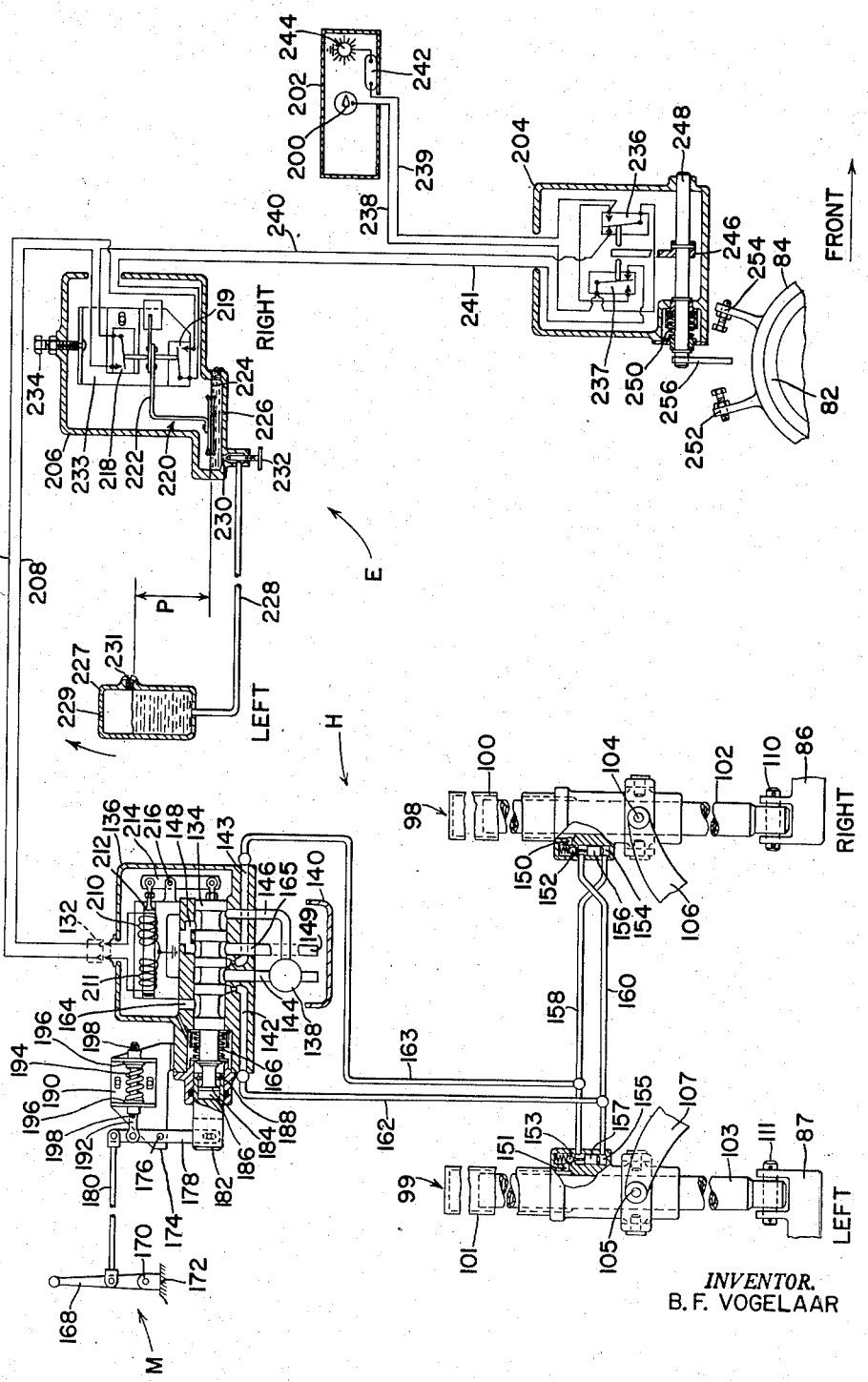

Aug. 6, 1957 B. F. VOGELAAR 2,801,511
LEVELING CONTROL SYSTEM FOR AGRICULTURAL MACHINE
Filed May 17, 1954 5 Sheets-Sheet 5
FIG. 8
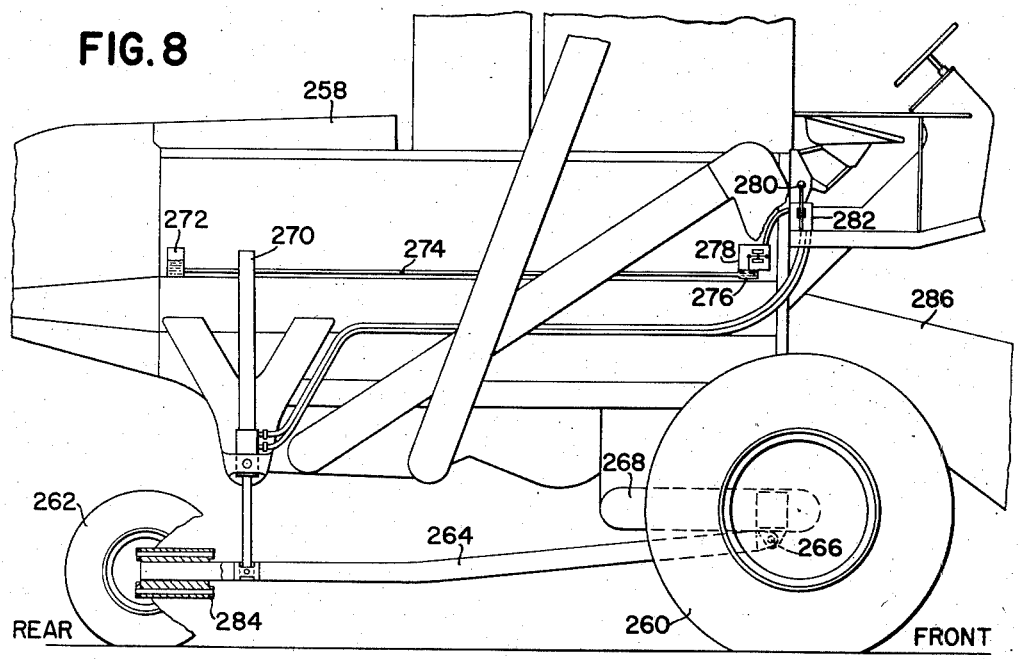
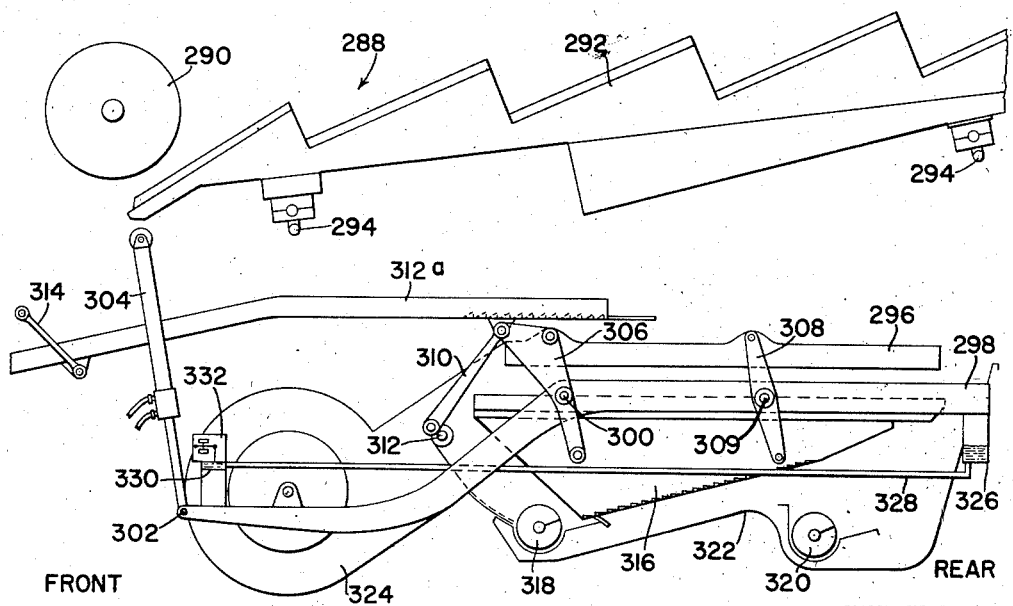
FIG. 9
INVENTOR.
B. F. VOGELAAR United States Patent Office 2,801,511
Patented Aug. 6, 1957

2,801,511

LEVELING CONTROL SYSTEM FOR AGRICULTURAL MACHINE

Bernard F. Vogelaar, Moline, Ill., assignor to Deere & Company, Moline, Ill., a corporation of Illinois Application May 17, 1954, Serial No. 430,338

15 Claims. (Cl. 56—209)

This invention relates to an agricultural machine and more particularly to leveling control means for a machine of the type adapted to operate on hillsides or other slopes of a degree sufficient to cause the machine to tilt to a working angle inconsistent with the ability of the machine to perform at its rated maximum efficiency.

An example of one such machine is the hillside combine, differing from ordinary combines in that the ground-engaging wheel means supporting the combine body are vertically adjustable relative to each other and relative to the body so that the wheels may accommodate themselves to slopes transverse to the line of travel while permitting the body to be maintained in a level position. That is to say, as a slope transverse to the line of travel is encountered, the wheel means at one side of the body will move upwardly and the wheel means at the other side will of course move downwardly. It will be appreciated therefore that if the body is rigidly connected to the wheel means it will tilt in accordance with or partake of the angle caused by the difference in relative elevations of the wheels. The disadvantages of attempting to operate a combine with the body tilted to an extreme angle as just noted have long been recognized and various types of leveling means are available for utilization as original or special equipment on hillside combines for cooperation with the wheels and the body to adjust the body relative to the wheels so that the body may assume a level position irrespective of the difference in elevations between the wheel means. It is also known to employ some form of automatic means for controlling the leveling means so that the level position of the body is automatically attained in response to variations in the difference between the wheel elevations as varying ground contour is encountered. The leveling mechanisms known may be of the hydraulic, pneumatic, hydro-pneumatic, etc. types and the automatic control system will ordinarily involve electrical, hydraulic or mechanical circuits initiated by such means as pendulums, mercury switches, etc.

Although the basic principles of leveling are generally appreciated, prior systems and the control thereof leave much to be desired in the way of operating efficiency, safety, and duality of automatic and manual control. It is therefore the principle object of the present invention to provide a design that affords maximum efficiency com bined with an unusual number of novel features, significant among which are the electrical control, right- and left-hand motors which respectively embody automatic safety check valves, and other features that will develop as the description progresses.

A still further feature of the invention resides in the utilization of the basic principles of the invention for the leveling of a combine body or the like in a vertical direction relative to an axis transverse to the line of travel, as well as leveling about an axis generally parallel to the line of travel. It is also a feature of the invention to utilize the principles of the system in leveling just the threshing and separating mechanism instead of the entire body.

Briefly, and specifically, the invention is particularly adapted for embodiment in a combine of the type having laterally spaced individually suspended wheel means capable of vertical movement relative to the body and to each other in opposite directions, thus mounting the body on the wheel means for tilting about a fore-and-aft extending axis. Opposite hydraulic motors are connected between opposite sides of the body and the opposite wheel means and are controlled by a main control valve which not only supplies fluid to one motor but positively opens a safety check valve in the other motor to permit the escape of fluid from that motor. In the event of rupture or leakage in a fluid line, the check valves in the motors will remain closed and will thus hydraulically lock the motors so that the body cannot accidentally tip or tilt relative to the wheel means. The main valve is under the control of automatic means including a pair of transversely spaced apart fluid containers interconnected by a fluid conduit. One of the containers has therein a liquid-pressure-responsive member movable from a normal position in response to the change in liquid head in the other container as the body tends to tilt when different slopes are encountered. The liquid-pressure-influenced member is associated with an electrical circuit that shifts the main control valve in one direction or the other to actuate the motors and thereby to return the body to its level position. Superimposed on the automatic system is a manual control system which may be operated independently of the automatic control system, a lost-motion connection affording a delay or interval in which the automatic system may operate without disturbing the manual system. A safety cut-out is embodied between the body and one of the wheel means so that when that wheel means moves to a predetermined maximum degree relative to the body the safety cut-out deactivates the automatic control system and further leveling of the body cannot be obtained. In conjuncion with the safety cut-out is a warning signal to the operator which informs him that the limit of leveling has been reached, from which he can ascertain that the slope that he is approaching may be too great to accommodate the machine in a tilted position.

The same features are in general obtainable in connection with other forms of the invention which relate to fore-and-aft leveling of the body and fore-and-aft leveling of the threshing and separating mechanism relative to the main body. These as well as other features will become apparent to those versed in the art as the aforementioned preferred embodiments of the invention are developed in the ensuing disclosure, the several figures in the appended drawings being described immediately below.

Figure 1 is a side elevational view of a representative combine equipped with the invention.

Figure 2 is a front view of the machine of Figure 1, showing the machine operating on a slope that inclines downwardly from left to right.

Figure 3 is a fragmentary transverse sectional view, on an enlarged scale, as seen along the line 3—3 of Figure 2, and illustrating a pivot or swivel connection between the combine platform or header and the main body.

Figure 4 is a view similar to Figure 2, but illustrating the machine with the header and feeder structure removed in order that the equalizing and power means may be more easily seen.

Figure 5 is a rear elevational view, with the lower portion of the machine omitted because of space limitations.

Figure 6 is a schematic view, with parts in section, of the electrical and hydraulic control system.

Figure 7 is a fragmentary sectional view, on an enlarged scale, showing one of the check valves and its association with its motor.

Figure 8 is a side elevational view, somewhat schematic and with some parts in section, showing the application of the principles of the invention to a machine in which fore-and-aft leveling of the entire body is accomplished.

Figure 9 is another modification in which leveling of the threshing and separating mechanism is accomplished relative to rather than as an integral part of the body.

FIGURES 1–7

The combine chosen for the purposes of illustration comprises a material handling or longitudinal main body part 10 carried on right- and left-hand ground-engaging wheel means 12 and 13 and right- and left-hand rear ground-engaging wheel means 14 and 15. The legends "front," "rear," "right" and "left" have been applied to the drawings in the interests of clarity. The right- and left-hand sides of the machine are those seen by an observer standing behind the machine and lokoing forwardly.

The front wheels 12 and 13 are relatively large and are traction wheels, furnishing the traction for propelling the machine forwardly over the ground. An upper forward portion of the body part 10 carries an operator's station 16 on which is an operator's seat 18. Conveniently grouped on the operator's station 16 are various controls for the machine, some of which are not shown, because they are not important. However, a steering wheel appears at 20 and has a mechanical connection via a steering shaft 22 and gear housing 24 with linkage 26 incorporating a hydraulic booster cylinder 28 for steering the rear wheels 14 and 15. The steering system is merely part of the basic combine structure and its illustration and description neither add to nor detract from the invention. The body part 10 may contain conventional threshing and separating mechanism (not shown in the disclosure of this form of the invention) operative to ultimately deliver threshed grain via an elevator 30 to a grain tank 32 located behind the operator's station 16 and ahead of an internal combustion engine 34 that furnishes power for driving the machine and the movable parts thereof. The grain tank 32 is unloaded by means of an unloading auger tube 35 that projects outwardly from the left-hand side of the tank, this auger tube being shown in its folded position in the drawings.

As the machine advances, it carries ahead of it a transverse harvester platform or header 36 of substantially greater width than the body. The header is connected to the body by means of a feeder house 38. The connection of the rear end of the feeder house to the body 10 is accomplished by means providing a pivot on a transverse axis 40, whereby the feeder house and header may be adjusted vertically in unison and relative to the body. The connection between the header 36 and feeder house 38 is accomplished by means such as that illustrated in Figure 3. For this purpose, the rear wall 41 of the header has secured thereto, as by bracing structure 36a and 36b (Fig. 1), an outer ring 42 journaled on and angularly movable relative to an inner ring 44 that is fixed to the front portion of the feeder house 38, as at 43 and 45. The basic principles of the structure of which Figure 3 is representative form the subject matter of the U. S. patent to Long 2,654,207, except that here the swivel joint afforded by the related rings 42 and 44 is in the plane of the junction between the header 36 and feeder house 38, whereas in the patent the swivel joint is accomplished in the plane of the junction of the rear end of the feeder house and the front part of the body 10. Fundamentally, the two structures are similar and, although there may be some specific advantages flowing from one over the other, the selection of the Figure 3 structure here is not made on the basis of importing any limitations into the present invention. Suffice it to say that although the feeder house 38 and header 36 are adjustable as a unit in opposite vertical directions about the pivot axis 40, the two are relatively angularly movable about a longitudinal or fore-and-aft extending axis common to the rings 42 and 44. The purpose of this connection, as will appear in greater detail below, is to enable the header or platform 36 to accommodate itself to a slope while the body and feeder house remain level.

The leading edge of the header or platform 36 is equipped, as is conventional, with cutting mechanism 46 which operates in conjunction with a reel 48 to deliver cut grain rearwardly to right and left-hand augers 50 and 51 that serve to move the harvested grain laterally inwardly in opposite directions to be fed through a feed opening 52 accomplished by registering parts of the header and feeder house (Figure 3), whence the grain is carried upwardly, as by a conveyor 54 within the feeder house 38, to the threshing mechanism (not shown) within the main body part 10.

In the illustration of the machine in Figure 4, the header and feeder house have been removed and visible in that figure is a front feed opening 56 in the body through which material carried by the feeder house conveyor 54 is delivered to the threshing mechanism. Also visible in this figure are right- and left-hand brackets 58 and 59 which support the rear end of the feeder house 38 to afford the pivot axis at 40, as previously described.

The drive for the feeder house conveyor 54, as well as the drive to such external components as the reel, augers, etc., is somewhat immaterial but will be briefly described merely for the purpose of eliminating any question as to what the various parts are. The pivotal rear mounting of the feeder house 38 at 40—58—59 includes a shaft on which is keyed a sprocket 60. A chain 62 is trained over this sprocket and about a forwardly located sprocket 64 from which a flexible power shaft 66 extends laterally outwardly to the right for driving an outer sprocket 68 (Figure 1). The central shaft of the reel carries a sprocket 70 in fore-and-aft alinement with the sprocket 68 and a driving chain 72 interconnects the two sprockets. This chain has been omitted from the illustration in Figure 1.

Tiltability of the body relative to the wheels 14 and 15—or stated otherwise, movement of the wheels 14 and 15 in opposite vertical directions relative to each other and relative to the body—is accomplished by a wheel-supported part or transverse axle 74 journaling the wheels 14 and 15 respectively at its opposite ends and pivotally mounted on a fore-and-aft axis included in a bearing 76 on a bracket 78 rigid with a rear portion of the body 10. Although all of the details of the structure just referred to are not shown, the absence thereof is deemed to be immaterial, since the illustrated structure may be replaced by any equivalent structure. Mounting of the front wheels 12 and 13 for movement relative to each other and to the body 10 in opposite vertical directions—or for enabling tilting of the body on a longitudinal or fore-and-aft extending axis—is somewhat different from the mounting of the rear wheels 14 and 15, but again the illustrated structure is only representative of many forms that could be used.

The forward lower portion of the body 10 has rigidly mounted thereon a sub-frame 80 which includes a transverse pivot tube 82 on which the rear end of a wheel-supported part or arm 84 is journaled. The forward end of the arm includes wheel-mounting structure including a wheel tube 86. Other details are involved in the commercial embodiment of the machine but these are immaterial for present purposes. The arm 84 thus carries the wheel 12 for angular movement or vertical oscillation about the pivot tube 82. The left-hand wheel is carried by a wheel-supported part or arm 85 having a wheel-supporting portion 87, the rear end of the arm being pivotally mounted on the left-hand end of the pivot tube 82 (Figure 4).

Since the rear wheels 14 and 15 are interconnected by the transverse axle 74, they need no separate equalizing means. However, since the wheels 12 and 13 are individually suspended, some means must be provided between the wheels and reacting on the body for equalizing the opposite vertical movement thereof. For this purpose, a transverse equalizer beam 88 is pivoted at its center on a fore-and-aft axis at 90 and has its opposite ends articulately connected to the wheel mounting portions of the right- and left-hand wheel-supported arms 84 and 85 by right- and left-hand yokes 92 and 93. Articulation is accomplished by the use of suitable universal joints or ball joints at such points as 94 and 96 on the right-hand connection and 95 and 97 on the left-hand connection. The arrangement is such that the wheels 12 and 13 are free to move vertically in upright planes without any conflict caused by arcuate movement of opposite ends of the equalizer 88. These details form the subject matter of assignee's co-pending application Ser. No. 420,284, filed April 1, 1954, and as far as concerns the present disclosure, the specific equalizer should be considered only representative.

From the description thus far, it will be seen that the front and rear wheels, considered as units, and the header 36 are adapted to follow any negotiable slope transverse to the line of advance, whereas the design of the connection of these units to the body and feeder house is such that the latter two components are intended to remain upright or level. Articulation between the slope-following components and those that are intended to remain level is accomplished by the pivot at 76 for the rear wheels 14 and 15, the articulate mounting of the front wheels at 82 (as equalized by the equalizer 88) and the ring joint 42—44 between the header and feeder house. Although the axes about which these various components pivot relative to the body and feeder house are not coaxial, they are all of a fore-and-aft nature. Although this may not be readily recognizable as to the mounting of the front wheels 12 and 13, the situation may be best appreciated by considering that these wheels are interconnected by the equalizer 88 and the arms 84 and 85 are merely suspension arms; that is to say, similar overall results would be obtained if the front wheels 12 and 13 were interconnected by a straight axle, the only difference being that in that case the planes of the wheels would not remain parallel to a longitudinal upright plane but would instead be normal to the particular slope encountered. Actually, the rear wheels are interconnected in such a manner that the planes of the wheels are parallel to an upright plane but for the purposes of the present case, specific design aimed at accomplishing commercial advantages may be ignored in the interests of simplicity.

On the foregoing basis, it will then be seen that without some form of connection between the body and wheels, in addition to those already described, the body would be free to tilt in opposite directions without any control thereover. Moreover, without some form of connection, there would be no means for leveling the body. Accordingly, some means must be provided to establish a connection for negativing the tendency of the body to tilt uncontrollably. For this purpose, the present disclosure incorporates power means in the form of a pair of power-operated devices 98 and 99 located respectively at the right- and left-hand sides of the bodies, being thus spaced apart in the same direction as the spacing between the wheels 12 and 13. The power system is preferably hydraulic and to this end, the right-hand power device 98 includes a fluid motor in the form of a cylinder 100 having a piston rod 102. The cylinder is supported adjacent its lower end by an articulate connection 104 to the upper and outer end of a rigid supporting bracket 106 mounted at its inner lower end 108 to the right-hand side of the sub-frame 80. The lower end of the piston rod 102 is articulately connected at 110 to the front end of the right-hand wheel-supported arm 84. Consequently, extension and retracion of the device 98 causes vertical movement of the right-hand wheel 12. As will be brought out below, the motor 100—102 is of the one-way type, but if it had sufficient capacity and were of the two-way type, it might be considered sufficient in and of itself without any additional means for the left-hand wheel. However, it is preferable to use the same sort of arrangement at the opposite side and to that end, the power device 99 includes a motor comprising a cylinder 101 and a piston rod 103, the cylinder being mounted at 105 on a supporting bracket 107 that is secured at its lower end 109 to the left-hand side of the sub-frame 80; the lower end of the piston rod 103 is articulately connected at 111 (Figure 6) to the left-hand wheel support 87.

At this point it will be understood in general that regulation of fluid to and from the devices 98 and 99 will affect the position of the body relative to the wheels. That is to say, when the devices are hydraulically locked, the body will partake of the changes in position of the wheels as they encounter different elevations in the ground contour, and that exhaust of fluid from one and the admission of fluid to the other will cause an adjustment of the body in a tilting or lateral direction to one side or the other, depending upon the manner of control. To this extent, the arrangement does not differ broadly from that heretofore known.

In order that the header 36 will accommodate itself to the ground slope encountered by the wheels 12 and 13, follow-up mechanism is utilized. The specific form of this mechanism is illustrated in Figure 1, wherein it will be seen that a pair of bell cranks 112 and 114 are pivotally mounted intermediate their ends respectively at 116 and 118 on the right-hand side of the feeder house 38. The front arm of the rear bell crank 112 and the rear arm of the front bell crank 114 are interconnected by a link 120 and the rear arm of the rear bell crank is connected by an upright link 122 to an ear or lug 124 near the right hand end of the equalizer beam 88. The front arm of the front bell crank 114 is connected by an upright link 126 to the outer ring 42 of the swivel joint 42—44 between the header 36 and the feeder house 38. The connections at opposite ends of the link 126 are readily visible at 128 and 130 in Figure 1. Since the connection 130 will be radially spaced from the axis of the swivel joint 42—44, vertical forces applied to the link 126 will cause the header to move angularly relative to the feeder house 38. These forces originate with the wheels 12 and 13 through the medium of the equalizer bar 88 and linkage and bell cranks 122—112—120—114. That is to say, as the right-hand wheel 12 moves upwardly, the bell crank 112 rocks in a clockwise direction, resulting in counterclockwise rocking of the bell crank 114 which, through the link 126, pulls upwardly on the outer ring 42 via the moment arm established between the point 130 and the actual fore-and-aft axis of the ring joint 42—46. This causes the right-hand end of the header 36 to move upwardly, which is just what is desired. The bell cranks and linkages are so proportioned that the header at all times remains substantially parallel with the ground slope encountered by the wheels 12 and 13. Of course, when the wheel 12 moves downwardly and the left-hand wheel 13 moves upwardly, the right-hand end of the header moves downwardly in a manner just the reverse of that described. Here again, the details are not important as part of the present invention but are disclosed in the interests of affording a clear understanding of the background structure of the particular machine to which the preferred embodiments of the invention are applied. This subject matter is part of assignee's co-pending application identified above.

FIGURE 6

The foregoing should suffice as a background organization of an agricultural machine having power devices 98 and 99 for leveling the body 10 relative to the wheels 12 and 13, it being understood that whatever leveling is accomplished between the components just mentioned applies also to leveling of the body relative to the rear wheels 14 and 15 and relative to the header 36. The description of Figure 6 is segregated from the foregoing for purposes of a ready understanding of the leveling control system, a sufficient number of the basic parts being shown in the schematic drawing to enable comprehension of the entire arrangement. Figure 6, as already mentioned, is somewhat schematic and for that purpose may be somewhat easier to understand if considered on the basis of the position of an observer standing behind the machine and looking forward. Accordingly, designation of the devices 98 and 99 as right and left exactly accords with the positions of the right- and left-hands of the reader, with the exception of the fragmentary showing of the pivot tube 82 and rear end portion of the right-hand wheel portion of the right-hand supporting arm 84, in which case the legend "front" is applied. That is to say, the illustration of the parts just mentioned is in a plane at right angles to the general plane of the devices 98 and 99, but that liberty has been taken in the interests of clarity and simplicity.

When Figure 6 is considered as a whole, it will be seen that it may be roughly separated into an electrical system, designated generally by the letter E, and a hydraulic system, designated generally by the letter H. The electrical system occupies roughly the right-hand half of the sheet and the left-hand half of the sheet is occupied by the hydraulic system. Supplementing the electrical or automatic control of the hydraulic system is a manual control means, indicated in its entirety by the letter M. Certain of these systems overlap to some extent but not to a degree sufficient to cause confusion. The electrical system may be separated from the hydraulic system by disconnecting the two at 132, which is representative of any kind of appropriate disconnect plug.

*Hydraulic system*

The basic actuating means for the power devices 98 and 99 comprises a main control valve member 134 that is selectively positionable in a valve housing 136. The devices 98 and 99 and the valve 134 are connected in a hydraulic circuit that includes a pump 138 and a reservoir 140. The valve housing has right- and left-hand motor passages 142 and 143 that are cut out of the circuit when the valve member 134 is in the neutral position as shown. A high pressure line 144 from the pump terminates, when the valve member is in its neutral position, in the valve bore but a high pressure by-pass 146 communicates via the valve bore and a reservoir passage 148 with a return or reservoir line 149. Hence, when the valve member 134 is in its neutral position, the pump circulates fluid at no appreciable pressure. When the valve member is shifted to one or the other of its active positions, the devices 98 and 99 are actuated. When the valve member 134 is moved to the left, the high pressure line 144 is connected to the motor passage 142; and when the valve member is shifted in the opposite direction or to the right, the high pressure line 144 is connected to the left-hand motor passage 143. Incidentally, the positions of the passages 142 and 143 in the housing 136 are reversed as respects "right" and "left," but as will hereafter appear, the ultimate fluid line connections to the devices 98 and 99 are reversed to accommodate the valve housing arrangement.

The left-hand motor 101, previously described generally, has a fluid passage 151 normally closed by a check valve ball 153 under compression of a check valve spring 153a. When the check valve is closed, it cuts the passage 151 off from a check-valve-control chamber 155 in which a check-valve-control member or plunger 157, structurally separate from the ball 153, is carried for axial movement. Figure 7 repeats, on an enlarged scale, the cut away portion of the device 99 in Figure 6 and this clearer illustration will serve also as an example of the identical construction of check-valve and check-valve-control means for the right-hand device 98, wherein there is fairly well shown in Figure 6 a fluid passage 150, a check valve 152 and a check-valve-control chamber 154 in which a check-valve-control plunger 156 is movable.

A first fluid-pressure-transmitting means in the form of a conduit 158 cross connects the devices 98 and 99 but at its left-hand end the conduit 158 is connected to the check-valve-control chamber 155 above the plunger 157 and the right-hand end of the conduit is connected to the right-hand check-valve control chamber 154 below the plunger 156. In short, the opposite ends of the conduit 158 are reversed. A second fluid-pressure-transmitting means in the form of a conduit 160 is connected at its left-hand end to the left-hand check-valve-control chamber 155 below the plunger 157 and at its right-hand end to the right-hand check-valve-control chamber 154 above the plunger 156, opposite ends of the conduit being reversed and in that respect the conduits 158 and 160 being symmetrical.

A fluid line 162 is connected at one end to the right-hand motor passage 142 in the valve housing 136 and is connected at its other end to the conduit 160 intermediate the ends of that conduit. A left-hand fluid line 163 is connected at one end to the left-hand motor passage 143 and at its other end to an intermediate point in the conduit 158. Assuming now that the valve 134 is operated without regard to the specific means whereby that result is achieved, it will be seen, as already described, that the valve member 134 in its neutral position enables free circulation of fluid by the pump 138. When the valve member 134 is shifted to the left, the high pressure line 144 is connected to the right-hand motor passage 142 and the by-pass 146 is blocked, and fluid under pressure is transmitted by the line 162 to the conduit 160. The right-hand end of this line leads to the right-hand motor between the check valve ball 152 and the check-valve control plunger 156 and therefore fluid pressure lifts the check valve ball and forces the plunger down and enters the right-hand cylinder 100, causing that cylinder to extend and to exert a downward force on the right-hand wheel 12 or an upward force against the right-hand bracket or support 106; thereby causing the combine body to tilt to the left. Since the left-hand end of the conduit 160 is connected to the left-hand motor 101 below the check-valve plunger 157, the fluid transmitted cannot enter the motor but does serve to raise the plunger 157 for positively unseating the check valve 153 against the bias of its spring. Because of the equalizer bar 88 that is connected between the wheels 12 and 13, downward forces applied to the right-hand wheel will result in the application of upward forces to the left-hand wheel; or, stated otherwise, as the body tilts to the left, the device 99 must shorten. Consequently, the positively opened check valve 153 permits the escape of fluid from the motor 101, which fluid returns via the line 163 to the left-hand motor passage 143 in the valve housing and then to the reservoir 140 via the reservoir line 149 and a reservoir passage 165 in the valve housing 136.

Conversely, movement of the valve member 134 to the right effects a high pressure connection between the line 144 and the left-hand motor passage 143, whence the fluid is transmitted via the line 163 to the conduit 158. The left-hand end of this conduit is connected to the left-hand motor 101 above the check valve control plunger 157 and thus the fluid pressure applied directly against the check valve 153 opens that check valve, forcing the plunger 157 down, and the fluid enters the motor 101 to cause the device 99 to extend, exerting a downward force on the left-hand wheel 13 and causing the combine body to tilt to the right. This necessarily requires shortening of the device 98 but since the right-hand end of the conduit 158 is connected to the right-hand motor 100 below the check valve control plunger 156 the check valve 152 is positively unseated to permit the escape of fluid from the right-hand motor. This fluid returns to the reservoir via the line 162, right-hand motor passage 142 in the valve housing 136 and via the interior of that housing to the tank passage 148, which communication across the valve bore is established by means of an exhaust passage 164.

The check valves 152 and 153 afford a safety feature that prevents serious damage in the event of rupture or leakage of the lines and conduits 158, 160, 162 and 163. That is to say, without the check valves 152 and 153, leakage or rupture in any one of the lines or conduits noted would permit escape of fluid from one or the other of the cylinders and the combine body could very easily tip toward the side at which the power-operated device became accidentally shortened. Stated otherwise, the check valves 152 and 153 cannot be opened unless subjected either to direct fluid pressure for extension of the respective motor or positive action of the respective check valve control plunger when the other motor is being extended. The possible consequences of a defective hydraulic system in the absence of the safety check valves can very easily be appreciated if it is assumed that the combine is operating on a relatively steep slope to the right. If the system fails and there were no check valve in the right-hand motor, that motor would immediately become exhausted of fluid and the body would tip toward the right. If the slope were steep enough, the entire machine would upset downwhill.

The valve member 134 is biased for return to its neutral position, the biasing means including a centering spring 166 which functions in a conventional manner and need not therefore be further elaborated. Suffice it to say that the centering means is effective irrespective of the direction in which the valve member 134 is caused to depart from its neutral position, the valve member 134 as will be obvious being bidirectional.

*Manual control means*

The valve housing 136 is preferably located conveniently to the operator's seat 18 and therefore may be appropriately supported in any suitable manner on the operator's station 16. This enables the utilization of the relatively close-coupled manual means M, which includes a main control lever 168 fulcrumed at 170 on any suitable support 172. A support or bracket 174, mounted in any adequate manner on the operator's station 16, establishes a fulcrum 176 for an intermediate lever 178, one end of which is connected by a link 180 to an intermediate point on the hand lever 168. The other end of the lever 178 is connected to a plunger 182 that is coaxial with the valve member 134. However, an end extension 184 of the valve member is loosely received in a recess 186 in the plunger 182, allowing an axial space so that the operating connection thus established affords lost motion or delay between movement of the plunger 182 and response of the valve member 134. A snap ring 188 is carried by the recessed interior of the right-hand end of the plunger 182 so as to engage the headed extension 184 of the valve member 134 from the opposite side, again lost motion being achieved. Consequently, it takes an initial displacement of the hand lever 168 before the valve member 134 responds, and this occurs regardless of the direction of movement of the parts.

Because of the lost motion between the valve member extension 184 and the manual control plunger 182, it is desirable that the manual control means have its own centering system. For this purpose, the support 174 carries a U-shaped bracket through opposite legs of which extends a centering link 192 having a pivotal connection to the upper portion of the intermediate lever 178. A centering spring 194 encircles the link 192 between the legs of the bracket 190 and is confined between a pair of shouldered washers 196, each of which is pinned to the link 192 by pins 198 in such manner that a one-way connection between the link and the respective washers is established. That is to say, the left-hand washer 196 is movable to the right with the link 192 because of the pin 198 but the link may move to the left relative to the washer, the shouldered portion engaging inwardly of the proximate leg of the U-shaped bracket 190. The same result obtains at the other end of the link. Therefore, when the control lever 168 is moved in a clockwise direction, for example, the upper end of the link 178 travels to the right. The right-hand shouldered washer 196 serves as an abutment against which the spring is compressed by the left-hand washer 196 as it is carried along by the link 192 because of the pin 198. When manual pressure on the link 168 is released, the spring 194 will center the lever 168. The reverse result obtains upon movement of the lever 168 to the left or in a counter-clockwise direction, in this case the left-hand shouldered washer 196 serving as an abutment and the right-hand shouldered washer serving as means for compressing the centering spring 194.

*Electrical system*

The electrical system operates in parallel with or is superimposed on the hydraulic system in addition to the manual system M. As previously described, the electrical system can be disconnected from the valve housing 136 by means of the disconnect plug 132. Nevertheless, because of the automatic features of the electrical system, it is virtually a necessary adjunct to the proper and efficient operation of a hillside machine. It will therefore be considered as though permanently connected to the hydraulic system. However, as will be pointed out below, the electrical system can be overpowered or dominated by the manual system.

The electrical circuit derives its potential from the electrical system of the combine, being connected thereto as by the ignition switch as shown at 200, which switch is mounted on a control panel 202 located at a point convenient to an operator on the operator's station 16. The circuit continues through a safety cut-out device 204 and thence to a main control switch box 206.

Right- and left-hand electrical leads 208 and 209 run from the switch box 206 to right- and left-hand coils 210 and 211 wound reversely as respects each other about an armature 212. These coils may be selectively energized to cause the armature to shift selectively in opposite directions and the movement of the armature is transmitted to the valve member 134, but in reverse, by a beam or lever 214 pivoted at 216 on a bracket forming part of the interior of the valve housing 136.

Whether or not one or the other of the coils 210 or 211 is energized depends upon the action of upper and lower single throw switches 218 and 219 contained within the switch box 206. As will be seen, the upper and lower switches are connected respectively to the right- and left-hand leads 208 and 209 and will subsequently be referred to as right- and left-hand control switches. Selective closing of the switches 218 and 219 is responsive to liquid-pressure-influenced means indicated generally by the numeral 220. This means includes a switch-control arm 222 mounted on a diaphragm 224 that separates the switch box 206 from a liquid container 226. The switch box 206 and consequently the container 226 are carried at the right-hand side of the body, being mounted at an upper rear right-hand portion of the grain tank 32 (Fig. 5). The container 226 and a second container 227 are cross-connected by a liquid conduit 228, the container 227 being mounted at the left-hand side of the combine, just across the grain tank 32 from the container 226. The right-hand end of the conduit 228 is connected to the liquid container 226 via an orifice 230 and the size of this orifice is regulated by a dampening adjustment needle 232. The opposite end of the line 228 is in free or open communication with the bottom of the liquid container 227, the top of which is vented to atmosphere at 229 and one side of which has an opening closed by a removable filler and level-testing plug or screw 231. The liquid system comprising the containers 226 and 227 and the conduit 228 is filled to the level determined by the plug 231, with some such liquid as in the form of an ethylene glycol base anti-freeze or its equivalent. Although any suitable liquid may be used, that mentioned is of a character that will minimize the effect of vaporization and obviate the need for draining the system in cold weather. When the combine body is perfectly level, both switches 218 and 219 should be opened, as shown in Fig. 6. Because of variations in manufacture and those due to other circumstances, this condition may not be immediately obtained at all times. For this reason, the switches 218 and 219 are mounted on a common support 233 which is adjustable relative to the switch box 206 by means of a leveling screw 234. Normally, the liquid in the container 227 will be at a level at such height above the diaphragm 224 as to create in the liquid system a liquid head designated generally by the dimension P. The result of this head is that a certain pressure will be created below the diaphragm, preferably sufficient to overcome friction and the weight of the parts connected to the diaphragm. When properly adjusted, the parts will occupy the neutral or normal positions as shown in Fig. 6, from which it will be apparent that the switches 218 and 219 are at opposite sides of a central neutral position determined by the diaphragm-connected arm 222. Since the valve member 134 is centered by its own centering means 166, it will be in a neutral position. The hydraulic devices 98 and 99 will be hydraulically locked and the combine body will in effect be rigidly connected to the wheels 12 and 13, being thus prevented from tilting to one side or the other relative to the wheels but able to partake of at least an initial tilt concomitant with the encountering of a transverse slope by the wheels 12 and 13.

As soon as the body partakes of any initial tilt, it will of course depart from its level position, resulting in variations in the liquid head P and causing the diaphragm to move upwardly or downwardly, depending upon the direction of initial tilt.

The various figures of the drawings, with the exception of Fig. 1, are based upon a situation in which the combine is operating on a slope that inclines downwardly from left to right. This means of course that the right-hand hydraulic device 98 is extended and the left-hand device 99 has been retracted or shortened. The accomplishment of this result, in which the combine body 10, as will be seen in Figs. 4 and 5, is perfectly upright whereas the slope is being followed by the wheels 12 and 13 and 14 and 15, as well as the header 36 (Fig. 2), may best be followed from a consideration of Fig. 6 on the assumption that the combine, originally traveling on level ground, encounters the slope of Figs. 2, 4 and 5.

Since the combine body is for all practical purposes rigidly connected to the wheels because of the hydraulically locked devices 98 and 99, the body will partake of the initial tendency to tilt as the wheels 12 and 13 begin to individually accommodate themselves to the slope. This means that initial tilt of the body will be toward the right, resulting in lowering of the right-hand liquid container and elevation of the left-hand container 227. It follows from this that the liquid head P will increase and will therefore create added pressure under the diaphragm 224, causing the diaphragm to move upwardly, whereupon the arm 222 will effect closing of the upper or right-hand switch 218. This will establish an electrical connection through the lead 208 to the right-hand coil 210, and the armature 212 will move to the right and through the beam 214 will cause the valve member 134 to shift to the left. As previously described, the high-pressure line 144 is communicated with the right-hand motor passage 142, line 162 and conduit 160. The right-hand end of the line, communicating with the check valve chamber 154 above the right-hand check valve control plunger 156 forces open the check valve 152 to transmit fluid to the cylinder 100. This extends the device 98. Simultaneously, fluid pressure at the left-hand end of the line 160 raises the left-hand check valve control plunger 157 to positively open the left-hand check valve 153 for enabling the escape or exhaust of fluid from the left-hand cylinder 101, thereby incurring shortening or retraction of the left-hand device 99. Since the initial tilt of the body is toward the right, it follows that extension of the device 98 and simultaneous contraction or shortening of the device 99 tilts the body in the opposite direction or to the left. However, as soon as the body reaches a level position, the original liquid head P is restored and the diaphragm returns to its neutral position, the switch 218 opening to cut off the current to the coil 210. The valve-centering means 166 is effective to return the valve member 134 to neutral. The check valves 152 and 153 close to again hydraulically lock the devices 98 and 99. Because of the lost-motion connection between the valve member 134 and the manually influenced plunger 182, the valve member 134 shifts automatically without picking up the manual system and without partaking of any of the load that would otherwise be imposed thereon by the manual system. Moreover, the energy required in shifting the valve 134 automatically is considerably less than would be required otherwise, since the spring 166 is the only load that has to be overcome, other factors being considered negligible, such as friction, etc. The same automatic control is available, of course, when the initial tilt of the combine is to the other side in accordance with the encountering by the wheels 12 and 13 of an oppositely directed slope.

As previously mentioned, there may be times when it is desirable for the operator to have manual control over leveling, despite the automatic control. For these purposes, the manual system is capacitated to overpower the automatic system. This result is obtained because the forces transmitted by the manual control are greater than those created in movement of the armature 212. Stated otherwise, the electrical means 210—211—212 may be considered a yieldable device so that when the valve member 134 is moved by the manual means—after the lost motion is picked up—such device offers no resistance to operation of the valve manually. One instance in which the manual control is desirable is in initially adjusting the system. For example, one method of testing the leveling adjustment as afforded by the leveling screw 234 is to tilt the combine by the manual control and allow the automatic control to bring it back to level. After this is accomplished by manual control to tilt the combine in both directions so that return is accomplished automatically from opposite directions, the intermediate or average level position may readily be determined. Of course, the manual control is essential in the event of failure of the automatic control. In either event, the hydraulic system functions as always, assuming that it is in working order, of course.

Another adjustment that is required is that of the dampening needle 232. This adjustment should be such that the system does not hunt. If the needle valve is closed too much, the time delay for automatic action will be too great. And if it is opened too far, the action will be erratic.

The safety device 204 contains right- and left-hand limit switches 236 and 237, which are in series between the ignition switch 200 and the switch box 206. Each of these switches is of the double-throw type and is connected in parallel to the ignition switch 200 by a lead 238. In a situation in which maximum leveling has not occurred, the two switches will be closed to establish electrical connections with right- and left-hand leads 240 and 241. When these switches are closed to establish the circuits just described, they are also open to break circuits to a signal in the form of a flasher unit 242 and signal lamp 244 mounted on the control panel 202. That is, unless the safety device is operative, the lamp 244 will not flash.

The switches 236 and 237 are under the control of a switch arm 246 pinned or otherwise secured to an axially shiftable rod 248 carried in the safety device housing 204. A centering spring 250 yieldably fixes the rod 248 and switch arm 246 in a central or neutral position in which both switches 236 and 237 are closed to complete the circuits through the leads 240 and 241. Since the switches 236 and 237 are of the double-throw type, the circuits to the flasher or signal lamp 244 are broken.

It has heretofore been assumed, in explanation of the operation of the system, that the slope encountered by the machine is one that inclines downwardly from left to right, so that leveling of the body is accomplished by extending the right-hand device 98 and contracting or shortening the left-hand device 99. The same assumption will be made with respect to an explanation of the operation of the safety device. As shown in Figs. 1 and 6, the rear end of the right-hand wheel-supporting arm 84 has thereon a pair of control members 252 and 254, between which depends an arm or member 256 secured to the exposed end of the switch arm rod 248. When the machine is in a perfectly level position on level ground, the member or arm 256 is centrally between the members 252 and 254, which is the starting or neutral position of Fig. 6. As the machine is automatically leveled from right to left to accommodate the left-to-right slope, the right-hand wheel moves downwardly, the wheel-supporting arm 84 pivoting at 82 in a clockwise direction. This means that as the wheel-supporting arm moves downwardly or in the direction just described, the control member 252 approaches the switch rod control arm 256, ultimately contacting that arm and moving the switch arm rod 248 against the bias of its centering spring 250 so as to actuate the switch 236, breaking the circuit through the lead 240 and establishing the circuit through the lead 239 to the signal or lamp 244. Thus, the circuit to the automatic leveling system is interrupted and no more leveling is available by the automatic phase of the system. Simultaneously, the lamp 244 flashes because of the activation of the flasher unit 242 and the operator is thus informed of the fact that the automatic leveling system will produce no more leveling. This is important in cases in which the slope on which the machine is operating is so extreme as to prevent perfect leveling of the combine body, thus indicating to the operator that he can expect the machine to operate at less than its maximum efficiency and may also indicate that the slope is too steep for safe operation.

The same result obtains when the slope is in the opposite direction; that is to say, the control member 254 engages the switch rod arm 256 and breaks the circuit to the leveling system to prevent further automatic lift to right tilt.

FIG. 8

In this form of the invention, the automatic leveling system of Fig. 6 is supplied to a combine for fore-and-aft leveling as distinguished from lateral leveling; although, the two may be combined by a simple modification of the system of Fig. 6. Assuming for present purposes, that fore-and-aft leveling alone is accomplished and realizing that the structure just described may be superimposed on a machine that is capable of fore-and-aft leveling, it will be seen that the principles just described may be readily applied. Hence, in the interests of simplicity, the machine shown in Fig. 8 will be assumed to comprise a combine having a material-handling part or body 258 carried on front and rear wheels 260 and 262. The mounting of the rear wheels is accomplished by a fore-and-aft extending, wheel-supported part or beam 264 pivoted at its front end at 266 to a framework structure 268. The rear end of the machine is supported by means of a power-operated device 270 which may be exactly like either of the devices 98 and 99. As a matter of fact, it is preferable that there be two such devices, one at each side of the machine, to insure stability. The device 270 (or devices, if two are used) is automatically controlled by a system like that of Fig. 6, the component parts of which will be recognized in Fig. 8 as a liquid container 272 connected by a conduit 274 to a second liquid container 276 that forms part of a switch box 278. Manual control is accomplished by means of a hand lever 280 which operates a valve (not shown) in a valve box or housing 282. It should be understood that the components just described; namely, 270, 272, 274, 276, 278, 280 and 282 correspond to the same components in Fig. 6; namely, 98 (or 99), 227, 228, 226, 206, 168 and 136.

The rear wheels 262 are mounted at the opposite ends of an axle structure, the intermediate portion of which is shown in section in Fig. 8 at 284. Thus, the combine body or body part 258 is supported by the front and rear wheels through the medium of the framework 268, the beam 264 and the hydraulically locked device 270. Also recognizable in Fig. 8 is a portion of a feeder house 286, which corresponds to the feeder house 38 in Figs. 1 through 5.

As the machine operates over the ground, the automatic leveling system operates very much like that of Fig. 6, except in the case of Fig. 8 the response of the system is to variations in slope parallel to the direction of travel. That is to say, when the machine is on perfectly level ground, the body part 258 is level and the hydraulic device 270 is hydraulically locked. As the machine approaches an incline, the initial tendency of the body 258 is to follow the wheels as they accommodate themselves to the incline. However, immediately after this tendency has been indulged, the liquid head varies as respects the containers 272 and 276 and the switches in the switch box 278 operate to shift the valve in the valve box 282 so as to restore the level repetition, it is assumed that cognizance will be taken of the incorporation of the Fig. 6 system in Fig. 8.

FIG. 9

In this figure, there is shown a structure in which the material-handling part is simply the threshing mechanism itself, as distinguished from the entire body, is leveled by a system such as that shown in Fig. 6. The numeral 288 represents the threshing mechanism in its entirety, at least that portion thereof that serves the separating function, and to that extent may be considered the full equivalent of the body or body parts 10 and 258. The mechanism 288 includes a feeder cylinder 290, in the form of a beater, which operates to receive grain from the threshing cylinder (not shown) and to cause it to move rearwardly over what will be recognized as a conventional straw walker 292. The straw walker reciprocates or oscillates by means of conventional supporting cranks 294 and grain still present in the straw carried by the straw walker sifts through the straw walker and drops onto a chaffer 296. The chaffer is mounted on a shoe 298 which is pivoted at 300 by suitable supporting structure (not shown) forming part of or attached to an enclosing body like the body parts 10 or 258. In other words, the point 300 is fixed and serves as a wheel-supported part or fulcrum about which the shoe 298 may be rocked. The shoe extends fore-and-aft and the front and rear ends of the structure are marked on the drawings by appropriate legends. The front end of the shoe is connected at 302 to the lower end of a power-operated device 304 which may be identical to the devices 98, 99 or 270. This device, being hydraulic, is capable of being hydraulically locked and when in that condition holds the shoe 298 against rocking or tilting as respects a fore-and-aft level position. Also pivoted at the point 300 is a front pair of levers 306, and a rear pair of levers 308 (only one of each pair being shown) is pivoted at 309 to the shoe 298 rearwardly of the pivot 300. The front lever 306 is in the form of a bell crank having a pitman connection 310 with a crankshaft 312, so that when the crankshaft rotates the shoe 298 remains stationary but the chaffer 296 is reciprocated, as is a screen or sieve 312a that is connected to the front lever 306 and that has its forward end supported by a link 314.

The levers 306 and 308 also serve to suspend for reciprocation a sieve 316 which ultimately delivers to a pair of transverse augers 318 and 320, enclosed at their bottoms by housing structure 322. It should be understood that the separating mechanism is illustrated only rather schematically and that any other separating mechanism could as well be utilized. A cleaner fan 324 is associated with the structure.

The rear part of the beam comprising the shoe 298 carries a fluid container 326 and this container is connected by a conduit 328 to a forward container 330 associated with a switch box 332. The components 326, 328, 330 and 332 may be exactly the same as those described in connection with Fig. 6. The switch box 332 contains switches that control a valve (not shown in Fig. 9) very much like the valve of Fig. 6 and the valve in turn controls the hydraulic device 304. The arrangement in Fig. 9 operates very much like that of Fig. 8; that is, leveling is accomplished in a fore-and-aft direction rather than in a lateral direction as in Fig. 1 through 5. Nevertheless, the arrangement could be incorporated in a structure such as shown in Figs. 1 through 5 or even in a structure such as shown in Fig. 8. The main difference between the Fig. 9 structure and those previously described is that in Fig. 9 only the separating mechanism rather than the entire body is level. Consequently, when the machine approaches an incline parallel to the line of travel, the tendency of the separating mechanism is to accommodate itself to the incline initiated by the combine wheels, but as soon as the initial tilt of the separating mechanism is of a sufficient degree, it is reflected by the change in liquid head between the containers 326 and 330, which results in actuation of the switch mechanism in the switch box 332, followed by extension or retraction of the motor or device 304, resulting in restoration of the level position of the beam or shoe 298. The arrangement is such that the oscillation of the parts is not disturbed by adjustment of the shoe 298, since the pivot at 300 does not change relative to the crankshaft 312.

SUMMARY

In all forms of the invention, automatic leveling is achieved by the system of Fig. 6 and in any case the automatic system may be overpowered by the manual system. The manual system is always present as an operating means in the event of failure of the automatic system. The safety feature incorporated in the devices 98 and 99 (and also in the devices 270 and 304) prevents serious damage or inconvenience in the event of failure of the hydraulic system. The safety device of Fig. 6, although not shown in Figs. 8 and 9, could as well be incorporated therein merely by connecting the safety device in the electrical circuit as shown in Fig. 6. As stated above, the fore-and-aft leveling of Fig. 8 could be combined with the lateral leveling of Figs. 1 through 6; or the structure of Fig. 9 could be incorporated in the structure of Figs. 1 through 5 for the purpose of adjusting the entire body with respect to lateral leveling and for the further purpose of adjusting the separating mechanism to accomplish fore-and-aft leveling.

Various other features of the invention, not specifically enumerated herein, will undoubtedly occur to those versed in the art, as will many modifications and alterations in the preferred forms of the invention illustrated, all of which may be achieved without departing from the spirit and scope of the invention.

What is claimed is:

1. A leveling control system for an agricultural machine having a tiltable body part carried for advance over a field by first and second ground-engaging wheel means spaced apart and connected to the body part for movement relative to the body part and relative to each other in opposite vertical directions to assume different elevations in accordance with ground contour encountered thereby, said leveling control system comprising: power-operated leveling means connected between the body part and the wheel means and normally demobilized to cause the body part to tend to tilt as the wheel means assume different relative elevations but mobilizable to adjust the body part relative to the wheel means for returning the body part to level position irrespective of such difference in elevation; first and second liquid containers connected to and movable with the body part in spaced relation according to the direction of spacing of the wheel means so as to partake of the initial tilt of the body part, and a liquid conduit interconnecting said containers; said first container having therein liquid-pressure-influenced means movable from and returnable to a normal position in response to changes in liquid pressure in said containers; said second container being so arranged relative to the first container as to contain a quantity of liquid at a normal level achieving a normal liquid head effective via the liquid conduit to maintain a substantially constant pressure on the liquid-pressure-influenced means and thus to secure the normal position of the said means when the body part is level, said liquid head varying according to the initial inclination of the body part to cause movement of the liquid-pressure-influenced means; actuating means connected to the power means for mobilizing and demobilizing said power means; and means interconnecting the actuating means and the liquid-pressure-influenced means for respectively mobilizing and demobilizing the power means in response to movement of said liquid-pressure-influenced means from and to its normal position in accordance with variations in the aforesaid liquid head.

2. The invention defined in claim 1, including: a safety device in and operative to nullify the interconnecting means between the liquid-pressure-influenced means and the actuating means; and means between the body part and at least one of the wheel means and engageable with the safety device to operate said device in response to a predetermined maximum degree of relative vertical movement between the body part and said wheel means.

3. The invention defined in claim 1, including: manual control means; and an operating connection from the manual control means to the actuating means for causing the actuating means to mobilize and demobilize the power means, said operating connection including lost-motion means enabling selective independent operation of the actuating means by either the manual means or the liquid-pressure-influenced means without disturbing the other.

4. The invention defined in claim 3, in which: the means interconnecting the actuating means and the liquid-pressure-influenced means includes a device capacitated to permit overpowering of said interconnecting means by the manual control means.

5. The invention defined in claim 1, in which: the liquid-pressure-influenced means is a diaphragm; and the interconnecting means includes an electrical circuit connected to the actuating means and having a switch operated by movement of the diaphragm.

6. The invention defined in claim 5, in which: the diaphragm is movable from a normal position to opposite sides of said normal position; the actuating means is bi-directional; the electrical circuit is capacitated to operate the actuating means selectively in either direction; the aforesaid switch is at one side of the normal position of the diaphragm for causing movement of the actuating means in one direction; and the circuit includes a second switch at the other side of the normal positions of the diaphragm for causing movement of the actuating means in the other direction.

7. The invention defined in claim 1, including: a fluid-pressure circuit in the power means and having a motor connected between the body part and at least one of the wheel means; a valve in the actuating means and associated with the fluid-pressure circuit for controlling the motor, said valve being movable from a neutral position in response to movement of the liquid-pressure-influenced means from its normal position; biasing means connected to the valve and yieldable to enable the aforesaid movement of the valve from its neutral position and operative further to return the valve to said neutral position upon return of the liquid-pressure-influenced means to its normal position; a manual control lever movable between a neutral position and an active position; an operating connection between the lever and the valve for effecting movement of the valve from its neutral position by movement of the lever to its active position, said operating connection having lost-motion means therein enabling movement of the valve in response to the liquid-pressure-influenced means and by the biasing means without causing movement of the lever; and second biasing means independent of the aforesaid biasing means and connected to the lever independently of the valve for yieldably securing the neutral position of the lever.

8. A leveling control system for an agricultural machine having a tiltable body part carried for advance over a field by first and second ground-engaging wheel means spaced apart and connected to the body part for movement relative to the body part and relative to each other in opposite vertical directions to assume different elevations in accordance with ground contour encountered thereby, said leveling control system comprising: first and second power-operated devices spaced apart on the body part and connected respectively to the first and second wheel means for moving the wheel means in opposite vertical directions, said devices respectively including first and second fluid-pressure-operated motors; each motor having a fluid passage therein and a check valve normally biased to close the passage against exit of fluid from the motor and openable by fluid pressure applied directly thereto for admitting fluid to the motor, each motor further having a check-valve-control chamber and a fluid-pressure-receivable check-valve-control element in the chamber engageable with the check valve to positively open the check valve against its bias; a first fluid-pressure conduit interconnecting the fluid passage of the first motor and the check-valve control chamber of the second motor and a second fluid-pressure conduit interconnecting the fluid passage of the second motor and the check-valve-control chamber of the first motor; a fluid pressure source including control valve means and first and second independent fluid lines leading from said control valve means respectively to the first and second conduits, said control valve means having a valve member normally settable in a neutral position deactivating the fluid lines and movable selectively to first and second active positions for respectively activating said lines, one thus activated line and its associated conduit serving to admit fluid to one motor via the fluid passage of that motor while simultaneously causing positive opening of the check valve of the other motor via the check-valve-control element of said other motor, and the other line and its conduit serving to carry fluid exhausting from said other motor via the positively opened check valve thereof; and equalizing means interconnecting the first and second wheel means and connected to the body for causing movement of one wheel means in one vertical direction under the influence of its motor to effect movement of the other wheel means in the opposite vertical direction.

9. A leveling control system for an agricultural machine having a tiltable body part carried for advance over a field by first and second ground-engaging wheel means spaced apart and connected to the body part for movement relative to the body part and relative to each other in opposite vertical directions to assume different elevations in accordance with ground contour encountered thereby; said leveling control system comprising: power-operated leveling means connected between the body part and the wheel means and normally demobilized to cause the body part to tend to tilt as the wheel means assume different relative elevations but mobilizable to adjust the body part relative to the wheel means for returning the body part to level position irrespective of such difference in elevation; actuating means connected to the power means and selectively changeable between active and inactive positions to mobilize and demobilize the power means; first biasing means normally incurring the inactive position of the actuating means; means connected to the actuating means for automatically incurring the active position of the actuating means in response to inclination of the body part from its level position; manually movable control means positionable selectively in active and inactive positions and having an operating connection to the actuating means for positioning said actuating means, and said operating connection including lost-motion means enabling-active-positioning of the actuating means by the automatic means without disturbing the manual control means; and second biasing means acting on the manual control means and effective to urge said manual control means to its inactive position.

10. A leveling control system for an agricultural machine having a fore-and-aft extending body part tiltable about a transverse axis and carried for advance over a field by first and second ground-engaging wheel means spaced apart fore-and-aft and connected to the body part for movement relative to the body part and relative to each other in opposite vertical directions to assume different elevations in accordance with ground contour encountered thereby; said leveling control system comprising: power-operated leveling means connected between the body part and the wheel means and normally demobilized to cause the body part to tend to tilt as the wheel means assume different relative elevations but mobilizable to adjust the body part relative to the wheel means for returning the body part to level position irrespective of such difference in elevation; first and second liquid containers connected to and movable with the body part in fore-and-aft spaced apart relation so as to partake of the initial tilt of the body part, and a liquid conduit interconnecting said containers; said first container having therein liquid-pressure-influenced means movable from and returnable to a normal position in response to changes in liquid pressure in said containers; said second container being so arranged relative to the first container as to contain a quantity of liquid at a normal level achieving a normal liquid head effective via the liquid conduit to maintain a substantially constant pressure on the liquid-pressure-influenced means and thus to secure the normal position of the said means when the body part is level, said liquid head varying according to the initial inclination of the body part to cause movement of the liquid-pressure-influenced means; actuating means connected to the power means for mobilizing and demobilizing said power means; and means interconnecting the actuating means and the liquid-pressure-influenced means for respectively mobilizing and demobilizing the power means in response to movement of said liquid-pressure-influenced means from and to its normal position in accordance with variations in the aforesaid liquid head.

11. A leveling control system for an agricultural machine having a wheel-supported part adapted to follow varying ground contour and a material-handling part connected to the wheel-supported part for tilting relative thereto as variations in ground contour are encountered, said leveling control system comprising power-operated leveling means connected between the material-handling part and the wheel-supported part and normally demobilized to cause the material-handling part to tend to tilt as the wheel-supported part encounters varying contour but mobilizable to adjust the material-handling part relative to the wheel-supported part for returning the material-handling part to level position irrespective of variations in ground contour; first and second liquid containers connected to and movable with the body part in spaced relation normal to the axis of tiltability of the material-handling part so as to partake of the initial tilt of said material-handling part, and a liquid conduit interconnecting said containers; said first container having therein liquid-pressure-influence means movable from and returnable to a normal position in response to changes in liquid pressure in said container; said second container being so arranged relative to the first container as to contain a quantity of liquid at a normal level achieving a normal liquid head effective via the liquid conduit to maintain a substantially constant pressure on the liquid-pressure-influence means and thus to secure the normal position of said means when the material-handling part is level, said liquid head varying according to the initial inclination of the material-handling part to cause movement of the liquid-pressure-influence means; actuating means connected to the power means for mobilizing and demobilizing said power means; and means interconnecting the actuating means and the liquid-pressure-influence means for respectively mobilizing and demobilizing the power means in response to movement of said liquid-pressure-influence means from and to its normal position in accordance with variations in the aforesaid liquid head.

12. The invention defined in claim 11, in which: the wheel-supported part includes a pair of wheel-supporting members spaced apart transversely to the line of advance and vertically movable relative to each other to assume different elevations in accordance with ground contour and carried thereby; said material-handling part is carried by the wheel-supported part for lateral tilting about a generally fore-and-aft extending axis; and the first and second fluid containers are spaced apart transversely, one at either side of an upright fore-and-aft plane including the aforesaid axis.

13. The invention defined in claim 11, in which: the wheel-supported part includes front and rear wheel means spaced apart lengthwise of the line of advance; the material-handling part is carried on the wheel-supporting part on an axis transverse to the line of advance; and the first and second fluid containers are spaced apart lengthwise of the line of advance.

14. The invention defined in claim 11, in which: the wheel-supported part includes a body; and the material-handling part includes threshing mechanism carried by the body for tilting as aforesaid.

15. A leveling control system for an agricultural machine having a wheel-supported part adapted to follow varying ground contour and a material-handling part connected to the wheel-supported part for tilting relative thereto as variations in ground contour are encountered, said leveling control system comprising power-operated leveling means connected between the material-handling part and the wheel-supported part and normally demobilized to cause the material-handling part to tend to tilt as the wheel-supported part encounters varying ground contour but mobilizable to adjust the material-handling part relative to the wheel-supported part for returning the material-handling part to level position irrespective of variations in ground contour; actuating means connected to the power means and selectively changeable between active and inactive positions to mobilize and demobilize the power means; first biasing means normally incurring the inactive position of the actuating means; means connected to the actuating means for automatically incurring the active position of the actuating means in response to inclination of the material-handling part from its level position; manually movable control means positionable selectively in active and inactive positions and having an operating connection to the actuating means for positioning said actuating means, and said operating connection including lost-motion means enabling-active-positioning of the actuating means by the automatic means without disturbing the manual control means; and second biasing means acting on the manual control means and effective to urge said manual control means to its inactive position.

References Cited in the file of this patent

UNITED STATES PATENTS

| 894,439 | Hovland | July 28, 1908 |
| 2,076,523 | Ballack et al. | Apr. 13, 1937 |
| 2,494,069 | Steffen | Jan. 10, 1950 |